No. 729,990. Patented June 2, 1903.

UNITED STATES PATENT OFFICE.

ERNST ZÜHL, OF BERLIN, GERMANY.

CELLULOID COMPOUND AND PROCESS OF MAKING SAME.

SPECIFICATION forming part of Letters Patent No. 729,990, dated June 2, 1903.

Application filed November 11, 1902. Serial No. 130,857. (No specimens.)

*To all whom it may concern:*

Be it known that I, ERNST ZÜHL, doctor of philosophy, a subject of the German Emperor, and a resident of 95 Belle-Alliancestrasse, in the city of Berlin, in the Empire of Germany, have invented certain new and useful Improvements in Celluloid Compounds and Process of Making Same, of which the following is a specification.

My invention has reference to a compound or composition which is employed in the arts and trades for the same purpose as celluloid and similar compositions.

Hitherto celluloid and celluloid-like compositions were manufactured by compounding camphor or a suitable succedaneum or substitute of camphor—as, for instance, phosphoric-acid esters, naphthyl acetate, &c.—with nitrated cellulose. The use of another cellulose ester, especially acetylated cellulose, was prevented by the circumstance that the products made by combining such cellulose esters with camphor or a succedaneum were fragile and brittle. I have discovered that such disadvantage is avoided by using the acetylated cellulose or another organic ester of cellulose in combination with nitrated cellulose and adding to such compound the usual admixture of camphor or a substitute of same. For certain purposes—for instance, to produce photographic films—the addition of camphor or a known succedaneum of same can be entirely omitted, only using the compound of nitrated cellulose with acetylated cellulose. In this case both these ingredients may be solved in a usual volatile solvent, and after solving the mixture in the solvent the latter is allowed to volatilize. The use of the said compound of nitrated cellulose with acetylated cellulose or with similar cellulose esters instead of nitrated cellulose only retards the combustion of the celluloid or articles made therefrom and also enhances their elasticity.

According as the celluloid may be more or less combustible the proportions of nitrated and acetylated cellulose can be varied within reasonable limits.

For many purposes I prefer to use the following examples of the new composition:

First. Seventy kilograms of nitrated cellulose and thirty kilograms of acetylated cellulose are mixed with or without the aid of an auxiliary solvent and the resulting mixture worked up in the usual manner.

Second. Seventy kilograms of nitrated cellulose and thirty kilograms of butyric-acid ester of cellulose are mixed with or without the aid of an auxiliary solvent and then worked up in the usual manner.

Third. Equal parts of nitrated cellulose and acetylated cellulose and camphor or a known succedaneum of camphor are mixed with or without the aid of an auxiliary solvent and then worked up in the usual manner.

Of course admixtures as usual in the manufacture of celluloid—such as resins, fats, oils, casein, &c.—can be added to the resulting mixture without touching the essential feature of the specified invention.

What I claim is—

1. As a new article of manufacture a composition to be used as a material in the arts and trades and composed essentially of nitrated cellulose and the esters of organic acids with cellulose, as specified.

2. As a new article of manufacture a composition to be used as a material in the arts and trades and composed essentially of nitrated cellulose and acetylated cellulose, as specified.

3. As a new article of manufacture a composition to be used as a material in the arts and trades and composed essentially of camphor and a mixture of nitrated cellulose and the esters of organic acids with cellulose, as specified.

4. As a new article of manufacture a composition to be used as a material in the arts and trades and composed essentially of camphor and a mixture of nitrated cellulose and acetylated cellulose, as specified.

5. As a new article of manufacture a composition to be used as a material in the arts and trades and composed essentially of a succedaneum of camphor in the manufacture of celluloid, and a mixture of nitrated cellulose and the esters of organic acids with cellulose, as specified.

6. As a new article of manufacture a composition to be used as a material in the arts and trades and composed essentially of a succedaneum of camphor in the manufacture of celluloid and a mixture of nitrated cellulose and acetylated cellulose, as specified.

7. The process of manufacturing an artificial material consisting in compounding nitrated cellulose with the organic esters of cellulose and then working the resulting mixture up into the material, as specified.

8. The process of manufacturing an artificial material consisting in compounding nitrated cellulose with acetylated cellulose and then working the resulting mixture up into the material, as specified.

9. The process of manufacturing an artificial material consisting in compounding a mixture of nitrated cellulose and organic esters of cellulose with camphor and then working the resulting mixture up into the material, as specified.

10. The process of manufacturing an artificial material consisting in compounding a mixture of nitrated cellulose and acetylated cellulose with camphor and then working the resulting mixture up into the material, as specified.

11. The process of manufacturing an artificial material consisting in compounding a mixture of nitrated cellulose and organic esters of cellulose with a succedaneum of camphor in the manufacture of celluloid and then working the resulting mixture up into the material, as specified.

12. The process of manufacturing an artificial material consisting in compounding a mixture of nitrated cellulose and acetylated cellulose with a succedaneum of camphor in the manufacture of celluloid and then working the resulting mixture up into the material, as specified.

Signed at Paris, France, this 25th day of October, 1902.

ERNST ZÜHL.

Witnesses:
EDWARD P. MACLEAN,
GEORGE E. LIGHT.